United States Patent
Singh et al.

(10) Patent No.: US 9,473,976 B1
(45) Date of Patent: Oct. 18, 2016

(54) METHOD AND SYSTEM FOR CONTROLLING BEARER QUALITY

(71) Applicant: Sprint Spectrum L.P., Overland Park, KS (US)

(72) Inventors: Jasinder P. Singh, Olathe, KS (US); Siddharth S. Oroskar, Overland Park, KS (US); Maulik K. Shah, Austin, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 239 days.

(21) Appl. No.: 14/459,606

(22) Filed: Aug. 14, 2014

(51) Int. Cl.
*H04W 28/02* (2009.01)
*H04L 29/06* (2006.01)

(52) U.S. Cl.
CPC ...... *H04W 28/0268* (2013.01); *H04L 65/1069* (2013.01); *H04W 28/0205* (2013.01); *H04L 29/06523* (2013.01); *H04W 28/0236* (2013.01)

(58) Field of Classification Search
None
See application file for complete search history.

(56) References Cited

U.S. PATENT DOCUMENTS

| 2012/0212569 A1* | 8/2012 | Lei | H04N 7/148 348/14.02 |
| 2013/0010622 A1 | 1/2013 | Horn et al. | |
| 2015/0223117 A1* | 8/2015 | Jha | H04W 36/0016 455/436 |

FOREIGN PATENT DOCUMENTS

EP          20130305557        * 4/2013

* cited by examiner

*Primary Examiner* — Christine Duong

(57) ABSTRACT

When a UE engages in application-layer session setup signaling with a session server via a radio access network and gateway, the UE conveys in its session setup signaling an indication of the UE's observed air interface quality (e.g., received signal strength or signal to noise ratio) and perhaps an indication of a characteristic of an neighboring air interface (e.g., a duplex configuration or band of the neighboring air interface). The session server then reports the UE's indicated air interface quality and perhaps neighboring air interface characteristic to a policy server, and the policy server uses that information as a basis to select a quality of service level for a bearer to be established between the UE and the gateway for carrying media content of the session. The policy server then invokes establishment of a bearer having the selected quality of service level.

19 Claims, 5 Drawing Sheets

METHOD AND SYSTEM FOR CONTROLLING BEARER QUALITY

BACKGROUND

Unless otherwise indicated herein, the information described in this section is not prior art to the claims and is not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

In an example arrangement, the network infrastructure may include one or more packet data network gateways (PGWs) or similar components that provide connectivity with a packet-switched network so as to support various communication services. For instance, the infrastructure may include gateways that support general packet-data communications, such as general web browsing, file transfer, and the like, and/or packet-based real-time media communications such as voice over Internet Protocol (VoIP) and streaming media for instance.

A representative PGW may sit as a node on a wireless service provider's private packet-switched network and may thus provide connectivity with various application servers and other entities on that private network, and with other such entities accessible through a connection between the service provider's network and one or more other networks such as the public Internet. By way of example, such a PGW may provide connectivity with an Internet Multimedia Subsystem (IMS) platform or other session server that supports VoIP calling and/or other such media services.

When a UE first enters into the coverage of cellular wireless network, the UE engages in a process of registering or "attaching" with the network, which may trigger setup of various communication channels for the UE and/or reservation of various communication resources for the UE. For instance, upon first detecting coverage of a base station, the UE may transmit an attach request message to the base station, which the base station may forward to a network controller such as a mobility management entity (MME). Upon authenticating and authorizing the UE, the network controller may then engage in further signaling with the base station and with a serving gateway (SGW), which may in turn engage in signaling with a PGW, ultimately resulting in setup of one or more bearer connections or "bearers" each extending, via the base station, between the UE and the PGW, through which the UE can then engage in packet-data communication via the PGW.

Each bearer established for a UE may define a logical communication tunnel that includes a radio bearer portion extending between the UE and the base station, and an access bearer portion extending between the base station and the PGW via the SGW. Further, each bearer may have a designated quality of service level, which may dictate how the packet data transmission along the bearer is handled by the network. For instance, a bearer could have a relatively high quality of service level, according to which network nodes (such as the base station, SGW, and various routers) along the bearer path could be set to prioritize routing of data on the bearer over routing of data on other bearers, perhaps to guarantee a particular minimum bit rate, a particular maximum level of packet delay, and/or a particular maximum level of packet loss. Alternatively, a bearer could have a relatively low quality of service level, such as a "best efforts" service level, according to which nodes along the bearer path would simply do their best to route data of the bearer, subject to higher priority handling of other bearer traffic.

In practice, a network such as this may initially establish for a UE one or more default bearers to enable the UE to engage in certain basic communications, with each default bearer having a respective quality of service level. By way of example, the network may initially establish for the UE a default Internet bearer with a best-efforts quality of service level, for use by the UE to engage in general Internet communications such as web browsing, e-mail messaging, and the like. Further, if the UE subscribes to VoIP service or another such service that would be served by an IMS, the network may initially establish for the UE a default IMS signaling bearer with a medium quality of service level, for use by the UE to engage in session setup signaling (such as Session Initiation Protocol (SIP) signaling) with the IMS to facilitate setup of VoIP calls or the like.

Further, as the UE is served by the network, the network may establish for the UE additional bearers as needed. For example, if the UE has an IMS signaling bearer and the UE engages in signaling over that bearer with an IMS to set up a packet-based real-time media session such as a VoIP call, the network may then establish for the UE a dedicated IMS bearer with a high quality of service level, for carrying media content of the session, such as VoIP voice packets, to and from the UE. Once the dedicated IMS bearer is established, the UE may then send and receive media content of the session over that dedicated IMS bearer.

OVERVIEW

A problem that can arise in a cellular wireless network is that, if the network has established for the UE a bearer of a particular quality of service level when the UE is in one base station coverage area and the UE then moves into another base station coverage area that does not support bearers of that particular service level, handover of the UE between the coverage areas may fail. For instance, when the network attempts to transfer the established bearer from being via one base station coverage area to being via another base station coverage area, the network may determine that the target base station coverage area does not support the bearer's quality of service level and may, in response, discontinue the transfer of that bearer. Consequently, as the UE moves into the new coverage area, the UE may no longer have use of that established bearer. For VoIP calls and other such ongoing sessions, this can be a particular issue from a user-experience standpoint.

Disclosed herein is a method and system to help overcome this issue. In one aspect, the disclosure provides for considering a UE's air interface quality (e.g., downlink signal strength) at the time a session is being set up for the UE, and using that air interface quality as a basis to select a quality of service level for a bearer that will be used to carry media content of the session between the UE and a PGW or the like (including between the UE's serving base station and the PGW). In this aspect, the network may normally be set to invoke, for carrying media content of the session, a bearer with a particular quality of service level (such as a highest quality of service level for VoIP). However, the network may determine that the UE's air interface quality at the time of session setup is particularly poor, in which case the UE may be likely to hand over to a neighboring base station coverage area that might not support bearers with that particular quality of service. Consequently, in that scenario, the network may instead invoke, for carrying media content of the session, a bearer with a different quality of service level, such as one that is supported by the neighboring base station coverage area.

In another aspect, the disclosure provides that the session setup signaling (such as SIP signaling) that flows from the UE to an IMS or other session server to set up the session in the first place may carry an indication of the UE's air interface quality. For instance, the UE may write an indication of its observed air interface quality into a SIP session-setup message that the UE sends to the session server. Conveniently, the session server may then report that indicated air interface quality to a policy server, which may then (i) select a bearer quality of service level based on the indicated air interface quality and (ii) cause a PGW to invoke setup for the UE of a bearer having the selected quality of service, for carrying media content of the session.

Accordingly, disclosed herein is a method for controlling bearer quality. In accordance with the method, when a VoIP session is being set up between an IMS and a UE that is served over an air interface by a base station, a policy server may receive from the IMS a report indicating that the VoIP session is being set up and further indicating a quality of the air interface as reported by the UE to the IMS during setup of the VoIP session. In turn, based at least in part on the air interface quality indicated by the received report, the policy server may then determine a quality of service level to use for a bearer that will carry VoIP voice data to and from the UE in the VoIP session, and the policy server may invoke use of the determined quality of service level for the bearer.

Further, disclosed herein is another method for controlling bearer quality. As disclosed, the method involves routing application-layer session setup signaling from a UE to a session server via a communication path that includes (i) a base station that serves the UE over an air interface and (ii) a PGW between the base station and the session server. Further, the application-layer session setup signaling may be for setup of a media session between the UE and the session server and may carry an indication of quality of the air interface as observed by the UE. In turn, the method then involves a policy server receiving, from the session server a report of the air interface quality indicated in the application-layer session setup signaling, and the policy server selecting, based at least in part on the air interface quality indicated by the received report, a quality of service level for a bearer that will carry media content of the session between at least the base station and the PGW. The method then involves the policy server invoking, for the media session, use of the bearer with the selected quality of service level.

In addition, disclosed is a policy server that is configured to carry out features such as those noted above. The policy server includes a network communication interface that is configured to transmit and receive packet data, and a controller that is configured to control bearer setup for communication sessions. In particular, the controller is configured to receive via the network communication interface from an IMS, when a VoIP session is being set up between the IMS and a UE that is served over an air interface by a base station, a report indicating that the VoIP session is being set up and further indicating a quality of the air interface as reported by the UE to the IMS during setup of the VoIP session. Further, the controller is configured to determine, based at least in part on the air interface quality indicated by the received report, a quality of service level to use for a bearer that will carry VoIP voice data to and from the UE in the VoIP session. And the controller is configured to invoke use of the determined quality of service level for the bearer.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
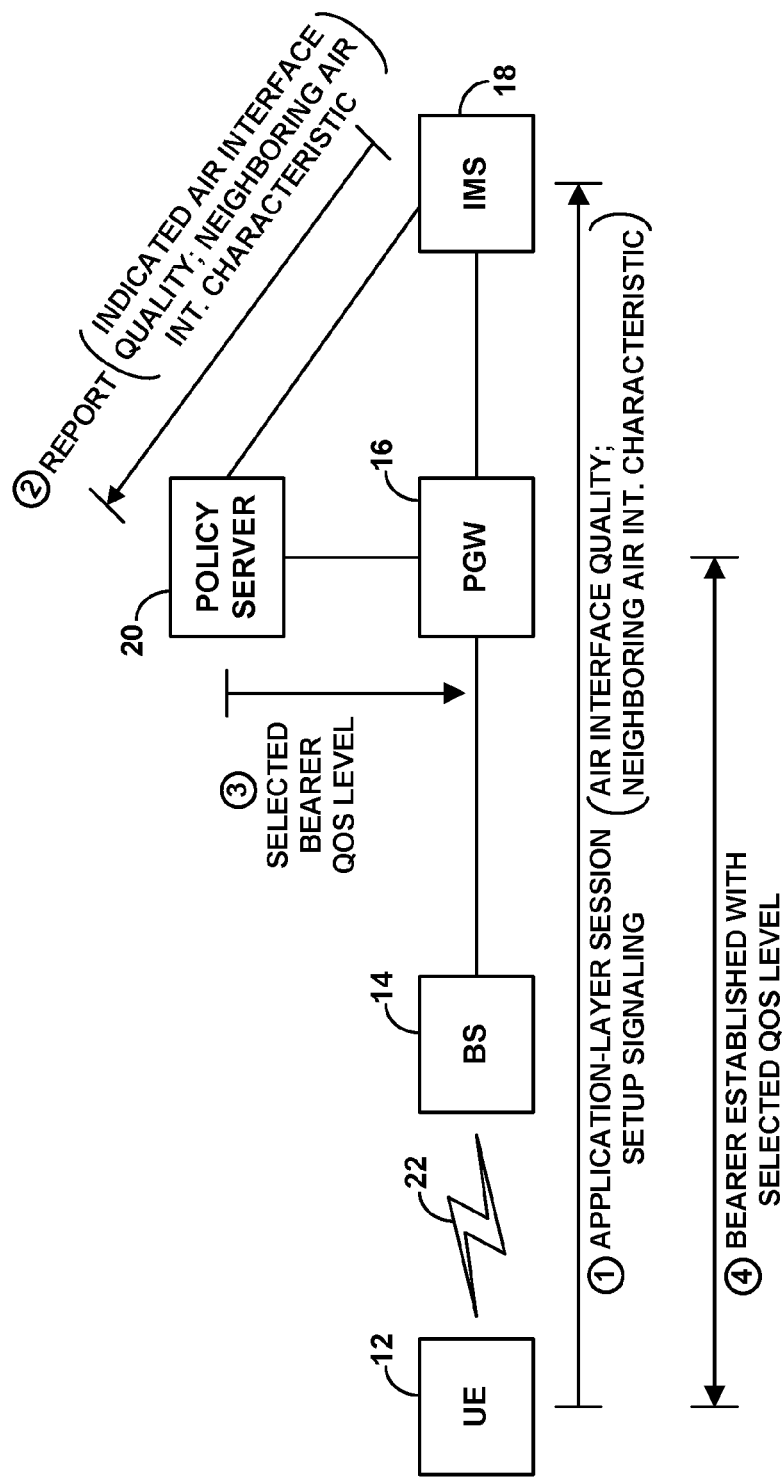
FIG. 1 is a simplified block diagram of an example network arrangement in which features of the present disclosure can be implemented.

Referring to the drawings, as noted above, FIG. 1 is a simplified block diagram of an example network arrangement in which the features of the present disclosure can be implemented. As shown in FIG. 1, the arrangement includes a UE 12, a base station 14, a PGW 16, an IMS 18, and a policy server 20. As shown, an air interface 22 extends between the UE 12 and the base station 14, and network communication paths exist between various entities, such as between the base station and the PGW, between the PGW and the IMS, between the IMS and the policy server, and between the policy server and the PGW.

It should be understood that this and other arrangements described herein are set forth for purposes of example only and that numerous variations are possible. For instance, features can be added, removed, combined, distributed, or otherwise modified. By way of example, although the policy server is shown separate from the IMS and the PGW, the policy server could instead be provided as a function of the IMS or as a function of the PGW. And as another example, the solid lines shown connecting various elements could take various forms (e.g., wireless, wired, circuit-switched, packet-switched, direct, indirect, etc.), including various intervening entities such as routers, gateways, and the like. Further, various features described herein as being carried out by a network or by one or more particular entities can be carried out by one or more of the various disclosed components of the network, and particularly by any combination of hardware, firmware, and/or software, such as by one or more processing units executing program instructions.

In practice, with the arrangement shown in FIG. 1, the UE 12 may be attached with the base station 14, and the network may have established for the UE a default bearer (e.g., a best-efforts bearer) for carrying general Internet communications and an IMS signaling bearer for carrying application-layer signaling between the UE and the IMS. In this state, the UE and IMS may thus engage in signaling with each other via the UE's IMS signaling bearer to establish a VoIP call or other such media session, and, when that session is being set up, the PGW may invoke establishment for the UE of a dedicated IMS bearer for use to carry media content of the session between the UE and the PGW. Once the session and bearer are set up, the UE may then engage in the session, with media content of the session flowing between the UE and the IMS (or between the UE and another party) via the UE's dedicated IMS bearer.

The application-layer signaling that flows between a UE and a session server such as an IMS platform to set up a VoIP call or other packet-based real-time media session can be SIP signaling, including an exchange of SIP invitation, acceptance, and acknowledgement messages. For instance, for a UE-originated call, the UE may transmit to the IMS a SIP INVITE message, the IMS may then respond to the UE with a SIP 200 OK message, and the UE may reply to the IMS with a SIP ACK message. Similarly, for a UE-terminated call, the IMS may transmit to UE a SIP INVITE message, the UE may respond to the IMS with a SIP 200 OK message, and the IMS may reply to the UE with a SIP ACK message. In practice, the SIP INVITE and 200 OK messages may include Session Description Protocol (SDP) fields that carry information about the session being set up, such as the type of media to be exchanged (e.g., voice, audio, video, etc.), the transport protocol that will be used (e.g., Real-time Transport Protocol (RTP) over User Datagram Protocol (UDP)), and the coding format of the session media (e.g., G.723.1 voice, H.261 video, etc.) Through exchange of this information, the UE and IMS may thus reach agreement on attributes of the session, so that the UE may then engage in session communication accordingly.

To facilitate setup of an appropriate bearer between the UE and the PGW to carry media content of the session, the IMS may further engage in signaling with the policy server 20, and the policy server may direct the PGW to invoke use of a bearer with an appropriate quality of service level. For instance, when the IMS receives from the UE a SIP INVITE that carries SDP information describing the requested session as a voice call or other such session, the IMS may transmit to the policy server a Diameter message that specifies that session type and/or a corresponding characterization of the session or associated quality of service level. In response, the policy server may then determine the appropriate corresponding quality of service level for the type of session being established, and may transmit to the PGW a Diameter message that directs the PGW to invoke use that quality of service level for a bearer that will carry media content of the session between the UE and the PGW. The PGW may then engage in signaling with network infrastructure to establish for the UE a bearer with that quality of service level, or to otherwise invoke use of such a bearer for the UE. For instance, as noted above, the quality of service level for a voice call may be a highest quality of service level, and thus the PGW may invoke establishment for the UE of a dedicated IMS bearer having that highest quality of service level.

In accordance with the present disclosure, as indicated above, the UE may include in its application-layer session setup signaling to the IMS or other session server an indication of quality of the air interface 22 as observed (e.g., measured or otherwise determined) by the UE, and the policy server may use that information as a basis to select an appropriate quality of service level for a bearer that will carry media content of the session between the UE and the PGW. Further, UE may include in its application-layer session setup signaling to the IMS or other session server an indication of a characteristic of a neighboring air interface (e.g., one to which the UE might hand over during the session), and the policy server may also use that indication as a basis to select an quality of service level for the bearer.

FIG. 1 depicts example signaling that could be used to facilitate this in practice. As shown in FIG. 1, at step 1, the UE transmits to the IMS an application-layer session setup message (e.g., a SIP INVITE or a SIP 200 OK) that facilitates setup of a VoIP call or other such session, and the UE includes in that message an indication of quality (e.g., received signal strength, or signal to noise ratio) of air interface 22. For instance, the UE may specify this air interface quality in one or more particular SDP fields of a SIP message that the UE sends to the IMS in the process of setting up the media session. Further, the UE may likewise include in the session setup message an indication of a characteristic of a neighboring air interface (e.g., a neighboring cell or sector) to which the UE could possibly hand over from air interface 22, such as an indication of a type of the neighboring air interface that might indicate that the neighboring air interface supports only one or more particular quality of service levels for bearers.

In this manner, while the session setup signaling from the UE to the IMS is facilitating setup of the session for the UE, the signaling also usefully carries to the IMS an indication of the UE's air interface quality and perhaps an indication of a relevant characteristic of a neighboring air interface. In accordance with the present disclosure, the IMS may then transmit to the policy server a report of the indicated air interface quality and perhaps a report of the indicated neighboring air interface characteristic, to enable the policy server to select an appropriate quality of service level for a bearer that will carry media content of the session between the UE and the PGW. For instance, the IMS may include a report of this information in the signaling (e.g., Diameter message) that the IMS sends to the policy server, as shown at step 2.

Although the policy server may then normally select for the UE's session a particular bearer quality of service level based on the indicated type of session as noted above, the policy server in this arrangement may instead select a different bearer quality of service level based at least in part on the report of the UE's indicated air interface quality. For example, although the policy server may normally select a highest quality of service level when the indicated session type is VoIP, the policy server in this arrangement may respond to the reported air interface quality being lower than some predefined threshold (e.g., a threshold low signal strength and/or a threshold low signal-to-noise ratio) by instead selecting lower than the highest quality of service level, such by selecting as a medium or lowest quality of service level for instance.

Further, the policy server may make this different selection of bearer quality of service based also on the indicated characteristic of the neighboring air interface. For example, if the neighboring air interface characteristic indicates that the neighboring air interface is of a type that would not support the bearer quality of service level that the policy server would normally select for the type of session at issue, and if the UE's indicated quality of air interface 22 is low enough that the UE seems likely to hand over, possibly to the neighboring air interface, then the policy server may select a bearer quality of service level different than the one it would normally select. In particular, the policy server may then select a bearer quality of service level that the neighboring air interface would support, so as to help ensure that if the UE hands over to that neighboring air interface during the session, the handover would be successful.

The policy server may then invoke use of the selected bearer quality of service level for the UE's session, by directing the PGW to establish for the session a bearer with the selected quality of service level. For instance, the policy server may include in its signaling (e.g., Diameter message) to the PGW a specification of the selected quality of service level, as shown at step 3. The PGW may then respond to that signaling by establishing for the UE of a bearer having the specified quality of service level, as shown at step 4, to carry media of the session. Alternatively, if the PGW already has established for the UE a bearer of the specified quality of service level, the PGW may respond to the signaling by establishing that the existing bearer will be used to carry media of the session. As the UE's session thus proceeds with the UE receiving incoming media content of the session and transmitting outgoing media content of the session, the media content may thus pass between the UE and PGW via the established bearer having the selected quality of service level.

Figure 2:
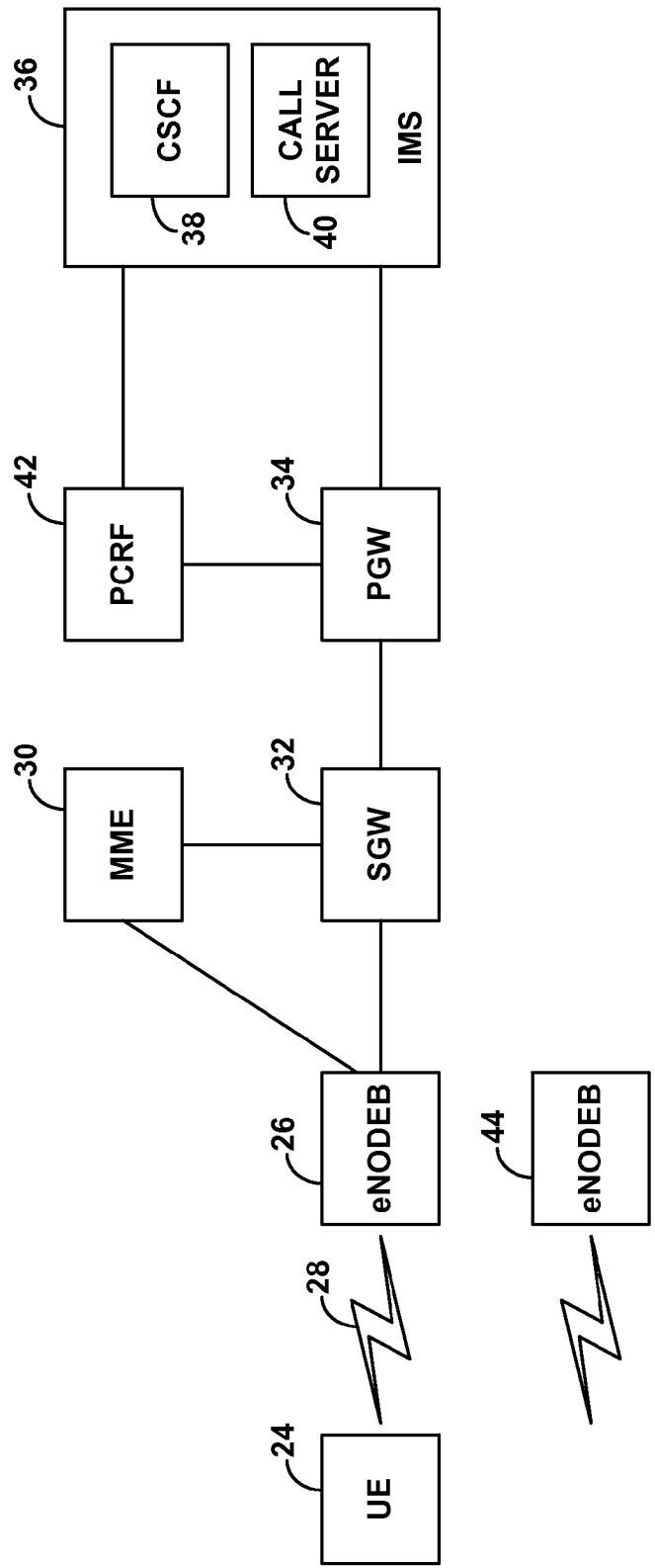
FIG. 2 is a more specific block diagram of an example network arrangement in which features of the disclosure can be implemented.

Turning to FIG. 2, a more specific block diagram is next provided to illustrate how this process can apply in a more particular network arrangement. In this arrangement, a UE 24 is served by a Long Term Evolution (LTE) network, although similar principles could apply with respect to various other radio access technologies. As shown, the UE is in communication with an LTE base station (eNodeB) 26 over an air interface 28 provided by the eNodeB, and the eNodeB then has an interface with a mobility management entity (MME) 30 and an interface with an SGW 32, which in turn has an interface with a PGW 34. The PGW 34 then has an interface with an IMS 36, which includes a call session control function (CSCF) 38 and a call server 40. And the IMS 36 has an interface with a policy and charging rules function (PCRF) 42, which in turn has an interface with the PGW 34.

Further shown in the figure is another eNodeB 44 that provides an air interface 46 neighboring air interface 28. This other eNodeB 44 may have interfaces (not shown) with the MME 30 and SGW 32 as well, and the network may support handover of the UE from being served by eNodeB 26 over air interface 28 to being served by eNodeB 44 over air interface 46. In practice, the air interface 28 provided by eNodeB 26 may have be different than the air interface 46 provided by eNodeB 44. For instance, air interface 28 might be a frequency division duplex (FDD) LTE air interface on a frequency band designated to be used for FDD LTE communication, whereas air interface 46 might be a time division duplex (TDD) LTE air interface on a frequency band designated to be used for TDD LTE communication. Other differences could exist as well.

In practice, the network nodes shown in this figure may all sit as nodes on one or more packet-switched networks, such as a wireless service provider's core packet network. Thus, the interfaces between the various nodes may be logical interfaces through which the nodes may engage in packet-switched communication with each other.

With this arrangement, when the UE first powers on in, or otherwise enters into coverage of eNodeB 26, the UE may engage in attach signaling with eNodeB, which may trigger the network to establish for the UE a default Internet bearer and, if the UE subscribes to IMS service, an IMS signaling bearer, and to assign to the UE an Internet Protocol (IP) address. In particular, the eNodeB may respond to an attach request from the UE by signaling to the MME, and the MME may then control setup of each such bearer, through a process that would include signaling between the MME and eNodeB, signaling between the eNodeB and the UE, signaling between the MME and SGW, and signaling between the SGW and the PGW.

Each such bearer may have an associated quality of service class indicator (QCI) level, which, in typical LTE implementation, could be from QCI 1 as a highest quality of service level to QCI 9 as a lowest (best-efforts) quality of service level. For instance, the default Internet bearer could be a QCI 9 bearer, and the IMS signaling bearer could be a QCI 5 bearer. Per bearer, this QCI level would be communicated to each node along the bearer path, to facilitate appropriate prioritization of data being transmitted on the bearer as discussed above.

Once the UE has an established IMS signaling bearer, the UE may then engage in application-layer session setup signaling with the IMS via its IMS signaling bearer. For instance, to initiate a VoIP call, the UE may transmit a SIP INVITE over the air interface 28 to the eNodeB 26, which may then pass from the eNodeB 26 to the SGW 32, in turn to the PGW 34, and from the PGW 34 to the IMS 36, with routing per the QCI level of the IMS signaling bearer. Further, the IMS may then respond to the UE with a SIP 200 OK, which would pass along a similar path to the UE, and so forth, ultimately resulting in setup for the UE's VoIP call of an RTP session between the UE and the IMS call server 40 (or between the UE and another designated node).

In line with the discussion above, the SIP signaling that the UE sends to the IMS to set up a session such as a VoIP call could carry an indication quality of the air interface 28 as observed by the UE. For instance, the UE could determine as the quality of the air interface a level of received signal strength (e.g., downlink LTE reference signal receive power (RSRP)) from eNodeB 26. Alternatively or additionally, the UE could determine as the quality of the air interface a level of signal to noise ratio (e.g., downlink LTE reference signal receive quality (RSRQ)) for the eNodeB 26. And the UE could write this information into an SDP field of a SIP INVITE or SIP 200 OK that the UE sends to the IMS.

Further in line with the discussion above, the SIP signaling that the UE sends to the IMS could also carry an indication of a characteristic of the neighboring air interface 48, such as (i) an indication of the duplex type (e.g., FDD or TDD) of the neighboring air interface, (ii) perhaps an indication of frequency band of the neighboring air interface, which may in turn indicate the duplex type based on the designations noted above, and/or (iii) an indication of quality of service level(s) supported by the neighboring air interface. The UE may determine the characteristic of the neighboring air interface from broadcast signaling that the UE detects from the neighboring air interface, or through other means.

While this SIP signaling facilitates setup of the VoIP call session for the UE, the signaling may pass through the CSCF 38 of the IMS 36. The CSCF 38 may then read the UE's SIP signaling to obtain from the SIP signaling the UE's indication of air interface quality and perhaps the UE's indication of neighboring air interface characteristic. And the CSCF 38 may responsively transmit to the PCRF 42 a report of that information, such as a Diameter message carrying the indication of air interface quality and perhaps the indication of neighboring air interface characteristic, or carrying other data that indirectly indicates such information, along with an indication of session type.

Faced with this report, the PCRF 42 may then select based on the report an appropriate QCI level for a bearer that will be used to carry media content of the VoIP call. For instance, given that the session is a VoIP call, the PCRF may normally select QCI 1 for the bearer. However, in accordance with the present disclosure, the PCRF may make its selection of QCI for the bearer based at least in part on the UE's indicated air interface quality and perhaps further based on the UE's indication of neighboring air interface characteristic. For instance, responsive to the indicated air interface quality being lower than a predetermined threshold level, the PCRF may select for the bearer a QCI level lower than QCI 1. Further, responsive to the indicated air interface quality being threshold low and the neighboring air interface characteristic being one that suggests the neighboring air interface would not support a QCI 1 bearer, the PCRF may select a QCI level lower than QCI 1 to facilitate possible handover of the UE from air interface 28 to air interface 46.

For example, in some implementations, FDD LTE air interfaces may be arranged to support (e.g., to allow) various QCI levels ranging from QCI 1 to QCI 9, so that VoIP calls would be carried over QCI 1 bearers as noted above, but TDD LTE air interfaces may be arranged to not support such quality differentiation and may support just a QCI 9 bearer quality. In such an arrangement, if the PCRF learns through this signaling that the UE has threshold low air interface quality (such that it could likely hand over to another air interface) and that the neighboring air interface is a TDD LTE air interface (and thus would not support QCI 1), the PCRF may decide to invoke use of a QCI 9 bearer for the UE's VoIP call, to facilitate possible mid-call handover of the UE from air interface 28 to air interface 46.

Once the PCRF selects the QCI level for the bearer, the PCRF may then engage in signaling to invoke use of that selected QCI level for the bearer. For instance, the PCRF may transmit to the PGW a Diameter message that directs the PGW to establish for the UE a bearer having the selected QCI level. In turn, the PGW, SGW, MME, eNodeB, and UE may engage in bearer-setup signaling to establish for the UE a bearer with the selected QCI level, and the VoIP call may then proceed via that bearer, with that QCI level. Alternatively, if the UE already has such a bearer with the PGW, signaling may establish that that existing bearer will be used for the VoIP call.

Figure 3:
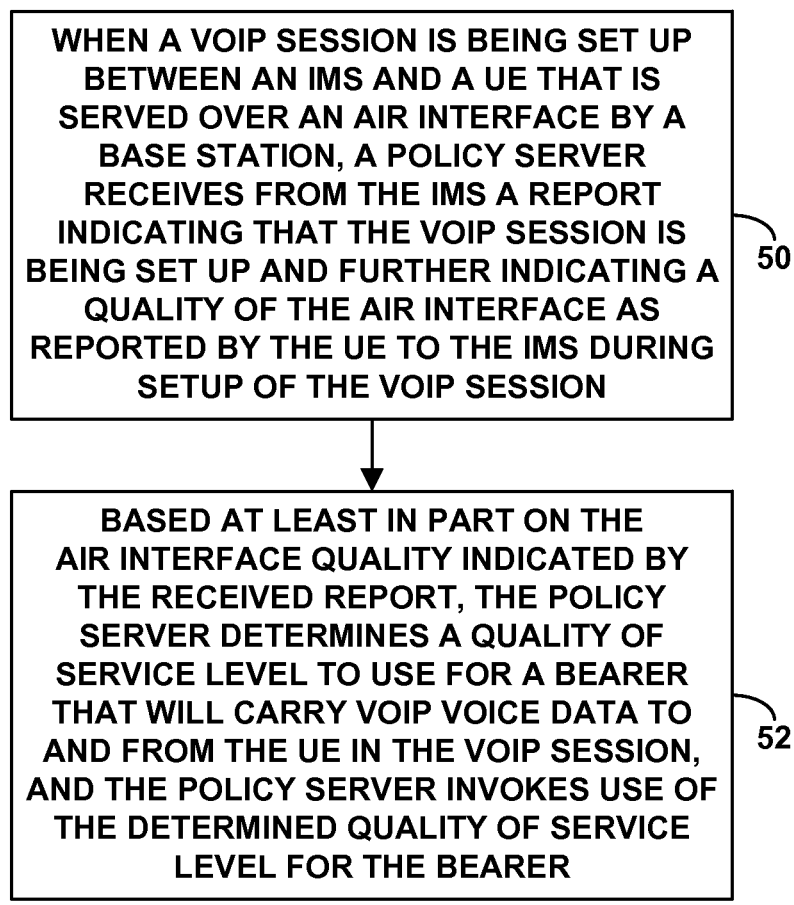
FIG. 3 is a flow chart depicting example steps that can be carried out in accordance with the disclosure.

FIG. 3 is next a flow chart depicting steps that can be carried out in accordance with this disclosure. As shown in FIG. 3, at block 50, when a VoIP session is being set up between an IMS and a UE that is served over an air interface by a base station, a policy server such as PCRF 42 may receive from the IMS a report indicating that the VoIP session is being set up and further indicating a quality of the air interface as reported by the UE to the IMS during setup of the VoIP session. In turn, at block 52, based at least in part on the air interface quality indicated by the received report, the policy server may determine a quality of service level to use for a bearer that will carry VoIP voice data to and from the UE in the VoIP session, and the policy server may invoke use of the determined quality of service level for the bearer.

By way of example, in line with the discussion above, a PGW may be disposed (be situated) in a communication path between the base station and the IMS, the bearer may extend between the UE and the PGW, and the act of invoking use of the determined quality of service level for the bearer may involve the policy server causing the PGW to invoke use of the determined quality of service level for the bearer, such as by transmitting to the PGW a directive as discussed above.

Further, in line with the discussion above, the act of determining the quality of service level to use for the bearer may be further based at least in part on a characteristic of a neighboring air interface provided by a neighboring base station, such as based on a frequency band of the neighboring air interface and/or based on a duplex configuration of the neighboring air interface.

Figure 4:
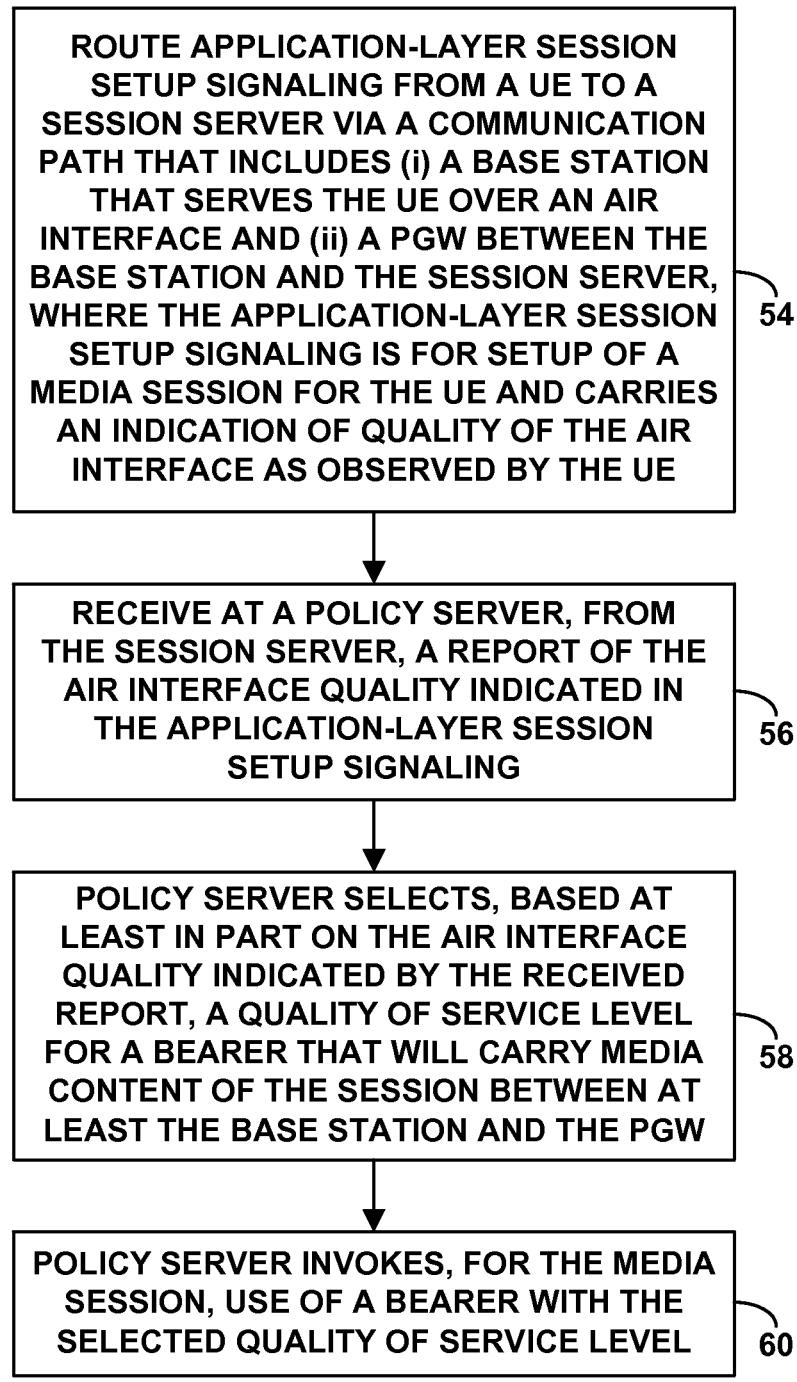
FIG. 4 is another flow chart depicting example steps that can be carried out in accordance with the disclosure.

Turning next to FIG. 4, another flow chart is provided also to illustrate a method that can be carried out in accordance with the present disclosure. As shown in FIG. 4, at block 54, the method may involve routing application-layer session setup signaling from a UE to a session server via a communication path that includes (i) a base station that serves the UE over an air interface and (ii) a PGW between the base station and the session server. In this process, the application-layer session setup signaling may be for setup of a media session for the UE and may carry an indication of quality of the air interface as observed by the UE. And the act of routing the signaling may involve transmitting the signaling from node to node, such as from the base station to an SGW and from the SGW to the PGW, for instance.

At block 56, the method may then involve receiving at a policy server, from the session server, a report of the air interface quality indicated in the application-layer session setup signaling. And at block 58, the method may involve the policy server selecting, based at least in part on the air interface quality indicated by the received report, a quality of service level for a bearer that will carry media content of the session between at least the base station and the PGW (e.g., between the UE and the PGW via the base station and an SGW). Further, at block 60, the method may involve the policy server invoking, for the media session, use of a bearer with the selected quality of service level.

In addition, here again, the application-layer session setup signaling may also carry an indication of a characteristic of neighboring air interface provided by a neighboring base station, in which case the report may further indicate the characteristic of the neighboring air interface, and the act of selecting of the quality of service level may be further based on the indicated characteristic of the neighboring air interface. In line with the discussion above, the characteristic of the neighboring air interface could include a frequency band and/or a duplex configuration of the neighboring air interface. For instance, the policy server could select a particular quality of service level for the bearer in response to (i) the neighboring air interface being a TDD air interface and (ii) the reported air interface quality being threshold low.

More particularly, the media session could be of a particular type, and the act of the policy server selecting the quality of service level for the bearer based at least in part on the air interface quality indicated by the received report could involve (i) making a determination that the indicated air interface quality is threshold low and (ii) responsive to making that determination, selecting the quality of service level based on consideration of what quality of service level a neighboring base station would support for the particular type of media session.

As discussed above, the policy server could select the quality of service level from a predefined set of quality of service levels each designated by a respective QCI, the set ranging from a highest-quality service level (e.g., QCI 1) down to a lowest-quality service level (e.g., QCI 9). In an example implementation, then, if the policy server determines that the indicated air interface quality is below a predefined threshold, then the policy server may responsively select as the quality of service level the lowest-quality service level from the predefined set. Whereas if the policy server determines that the indicated air interface quality is not below the predefined threshold, then the policy server may responsively select selecting as the quality of service level the highest-quality service level from the predefined set.

Further as discussed above, the act of the policy server invoking use of the bearer with the selected quality of service level for the media session may involve the policy server engaging in signaling to create the bearer with the selected quality of service level. For instance, the policy server may signal to the PGW to direct the PGW to invoke use of the bearer with the selected quality of service level, in which case the PGW may responsively engage in further signaling (e.g., with the SGW) to invoke use of the bearer with the selected quality of service level. Alternatively, the policy server may establish that an existing bearer with the selected quality of service level will be used as the bearer to carry the media content.

Figure 5:
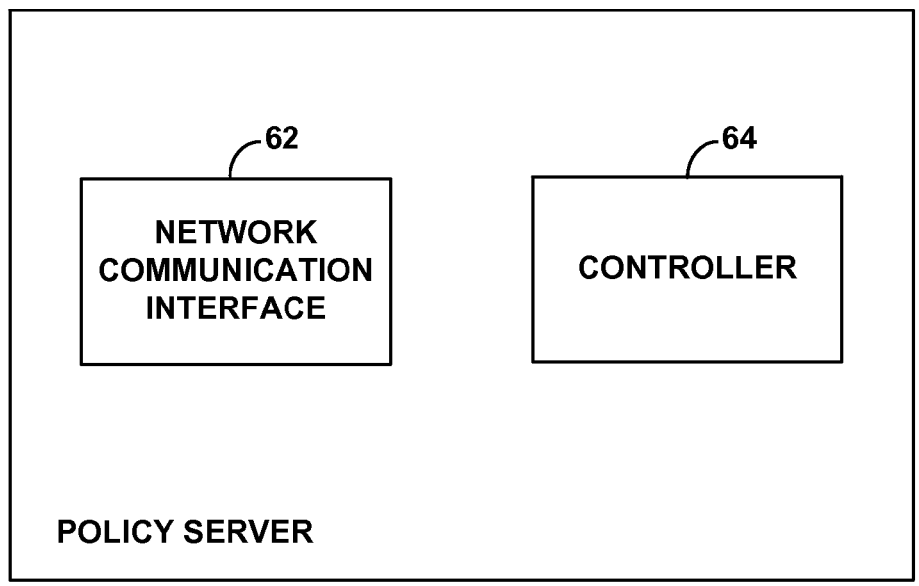
FIG. 5 is a simplified block diagram of an example policy server operable in accordance with the disclosure.

Finally, FIG. 5 is a simplified block diagram of an example policy server, showing some of the components that such a server may include to facilitate carrying out features of the present disclosure. As shown in FIG. 5, the example policy server includes a network communication interface 62 configured to transmit and receive packet data, and a controller 64 configured to control bearer setup for communication sessions. To facilitate carrying features as discussed above, for instance, the controller may be configured to receive via the network communication interface from an IMS, when a VoIP session is being set up between the IMS and a UE that is served over an air interface by a base station, a report indicating that the VoIP session is being set up and further indicating a quality of the air interface as reported by the UE to the IMS during setup of the VoIP session. Further, the controller may be configured to determine, based at least in part on the air interface quality indicated by the received report, a quality of service level to use for a bearer that will carry VoIP voice data to and from the UE in the VoIP session. And still further, the controller may be configured to invoke use of the determined quality of service level for the bearer.

In practice, the controller may comprise one or more processing units (such as one or more general purpose processors and/or application specific integrated circuits) programmed with instructions that the processor(s) may execute so as to carry out these features. Thus, when the policy server receives the report from the IMS, the processor(s) may read the report to determine that the VoIP session is being set up for the UE and to determine the indicated quality of the air interface, and the processor(s) may then select a bearer quality of service level (e.g., QCI level) based at least in part on that indicated air interface quality. The processor(s) may then generate and transmit to a PGW or the like a control signal that directs use of the selected quality of service level for a bearer to carry VoIP data to and from the UE during the session.

Exemplary embodiments of the present invention have been described above. Those skilled in the art will understand, however, that changes and modifications may be made to these embodiments without departing from the true scope and spirit of the invention, which is defined by the claims.

We claim:

1. A method comprising:
when a voice over Internet Protocol (VoIP) session is being set up between an Internet Multimedia Subsystem (IMS) and a user equipment device (UE) that is served over an air interface by a base station, receiving at a policy server from the IMS a report indicating that the VoIP session is being set up and further indicating a quality of the air interface as reported by the UE to the IMS during setup of the VoIP session; and
based at least in part on the air interface quality indicated by the received report, determining by the policy server a quality of service level to use for a bearer that will carry VoIP voice data to and from the UE in the VoIP session, and invoking by the policy server use of the determined quality of service level for the bearer;
wherein a packet data network gateway (PGW) is disposed in a communication path between the base station and the IMS, wherein the bearer extends between the UE and the PGW, and wherein invoking by the policy server use of the determined quality of service level for the bearer comprises the policy server causing the PGW to invoke use of the determined quality of service level for the bearer.

2. The method of claim 1, wherein determining by the policy server the quality of service level to use for the bearer is further based at least in part on a characteristic of a neighboring air interface provided by a neighboring base station.

3. The method of claim 2, wherein the characteristic comprises a frequency band, and wherein determining by the policy server the quality of service level based at least in part on the characteristic comprises determining by the policy server the quality of service level based at least in part on the frequency band.

4. The method of claim 2, wherein the characteristic comprises a duplex configuration, and wherein determining by the policy server the quality of service level based at least in part on the characteristic comprises determining by the policy server the quality of service level based at least in part on the duplex configuration.

5. A method comprising:
routing application-layer session setup signaling from a user equipment device (UE) to a session server via a communication path that includes (i) a base station that serves the UE over an air interface and (ii) a packet data network gateway (PGW) between the base station and the session server, wherein the application-layer session setup signaling is for setup of a media session for the UE and carries an indication of quality of the air interface as observed by the UE;
receiving at a policy server, from the session server, a report of the air interface quality indicated in the application-layer session setup signaling;
selecting by the policy server, based at least in part on the air interface quality indicated by the received report, a quality of service level for a bearer that will carry media content of the session between at least the base station and the PGW; and
invoking, by the policy server, for the media session, use of the bearer with the selected quality of service level.

6. The method of claim 5, wherein the application-layer session setup signaling further carries an indication of a characteristic of neighboring air interface provided by a neighboring base station, wherein the report further indicates the characteristic of the neighboring air interface, and wherein the selecting of the quality of service level is further based on the indicated characteristic of the neighboring air interface.

7. The method of claim 6, wherein the indicated characteristic of the neighboring air interface comprises a frequency band of the neighboring air interface, wherein the selecting of the quality of service level is based on the indicated frequency band of the neighboring air interface.

8. The method of claim 6, wherein the indicated characteristic of the neighboring air interface comprises a duplex configuration of the neighboring air interface, wherein the selecting of the quality of service level is based on the indicated duplex configuration of the neighboring air interface.

9. The method of claim 8, wherein the policy server selects a particular quality of service level for the bearer in response to (i) the neighboring air interface being a time-division-duplex air interface and (ii) the reported air interface quality being threshold low.

10. The method of claim 5, wherein the media session is of a particular type, and wherein selecting by the policy server the quality of service level for the bearer based at least in part on the air interface quality indicated by the received report comprises:
  determining that the indicated air interface quality is threshold low; and
  responsive to at least the determining, selecting the quality of service level based on consideration of what quality of service level a neighboring base station would support for the particular type of media session.

11. The method of claim 5, wherein the application-layer session setup signaling from the UE to the session server comprises a Session Initiation Protocol (SIP) message, and wherein the SIP message carries the indication of quality of the air interface in one or more Session Description Protocol (SDP) fields.

12. The method of claim 5, wherein the media session is a voice over Internet Protocol (VoIP) call to or from the UE.

13. The method of claim 5, wherein the indication of quality of the air interface comprises information selected from the group consisting of (i) downlink signal strength as measured by the UE and (ii) downlink signal-to-noise ratio as determined by the UE.

14. The method of claim 5, wherein selecting the quality of service level comprises selecting a quality of service level from a predefined set of quality of service levels each designated by a respective quality of service class indicator (QCI), the set ranging from a highest-quality service level down to a lowest-quality service level.

15. The method of claim 14, wherein selecting the quality of service level based at least in part on the received report of the indicated air interface quality comprises:
  making a determination of whether the indicated air interface quality is below a predefined threshold level;
  if the determination is that the indicated air interface quality is below the predefined threshold, then selecting as the quality of service level the lowest-quality service level from the predefined set; and
  if the determination is that the indicated air interface quality is not below the predefined threshold, then selecting as the quality of service level the highest-quality service level from the predefined set.

16. The method of claim 15, wherein the lowest-quality service level is QCI 9, and wherein the highest-quality service level is QCI 1.

17. The method of claim 5, wherein invoking by the policy server use of the bearer with the selected quality of service level for the media session comprises a function selected from the group consisting of (i) engaging in signaling to create the bearer with the selected quality of service level and (ii) establishing that an existing bearer with the selected quality of service level will be used as the bearer to carry the media content.

18. The method of claim 17, wherein invoking by the policy server use of the bearer with the selected quality of service level for the media session comprises signaling from the policy server to the PGW to direct the PGW to invoke use of the bearer with the selected quality of service level, whereby, in response to the signaling from the policy server, the PGW engages in further signaling to invoke use of the bearer with the selected quality of service level.

19. A policy server comprising:
  a network communication interface configured to transmit and receive packet data; and
  a controller configured to control bearer setup for communication sessions,
  wherein the controller is configured to receive via the network communication interface from an Internet Multimedia Subsystem (IMS), when a voice over Internet Protocol (VoIP) session is being set up between the IMS and a user equipment device (UE) that is served over an air interface by a base station, a report indicating that the VoIP session is being set up and further indicating a quality of the air interface as reported by the UE to the IMS during setup of the VoIP session,
  wherein the controller is further configured to determine, based at least in part on the air interface quality indicated by the received report, a quality of service level to use for a bearer that will carry VoIP voice data to and from the UE in the VoIP session, and
  wherein the controller is configured to invoke use of the determined quality of service level for the bearer;
  wherein a packet data network gateway (PGW) is disposed in a communication path between the base station and the IMS, wherein the bearer extends between the UE and the PGW, and wherein invoking by the policy server use of the determined quality of service level for the bearer comprises the policy server causing the PGW to invoke use of the determined quality of service level for the bearer.

* * * * *